United States Patent [19]
Gibson

[11] Patent Number: 5,168,637
[45] Date of Patent: Dec. 8, 1992

[54] MEASURING DEVICE

[75] Inventor: Jeremy H. Gibson, Eastlake, Ohio

[73] Assignee: Leichtung, Inc., Cleveland, Ohio

[21] Appl. No.: 799,330

[22] Filed: Nov. 27, 1991

[51] Int. Cl.$^5$ .......................... B27G 23/00; G01B 5/00
[52] U.S. Cl. ........................................ 33/628; 33/640;
33/679.1; 33/832
[58] Field of Search ....................... 33/626, 640, 679.1,
33/628, 633, 638, 641, 642, 832, 833, 427, 494

[56] References Cited

U.S. PATENT DOCUMENTS

| | | | |
|---|---|---|---|
| 2,325,558 | 7/1943 | Uslan | 33/832 |
| 2,670,542 | 3/1954 | Hull | 33/832 |
| 2,797,491 | 7/1957 | Asperger | 33/427 |
| 4,930,221 | 6/1990 | Taylor | 33/640 |
| 4,945,651 | 8/1990 | Georg | 33/832 |
| 5,036,596 | 8/1991 | Gyoury et al. | 33/832 |

FOREIGN PATENT DOCUMENTS 0752927  7/1956  United Kingdom ................. 33/832

OTHER PUBLICATIONS

American Machinist, "Tool Bits Scribe for Height-Gage" Sep. 1, 1952.

Primary Examiner—William A. Cuchlinski, Jr.
Assistant Examiner—Alvin Wirthlin
Attorney, Agent, or Firm—Frank B. Robb

[57] ABSTRACT

A measuring device having a vertical column and a horizontal foot extending therefrom, the column having an indicator block adjustably slidable thereon, an indicator plate on the block for engaging a tool to operate on a workpiece, and indicia on the column related to the plate to establish the position of the tool with relation to different surfaces of the plate, and scribing portions on the plate to mark a workpiece when the column is moved with relation to such workpiece.

3 Claims, 1 Drawing Sheet

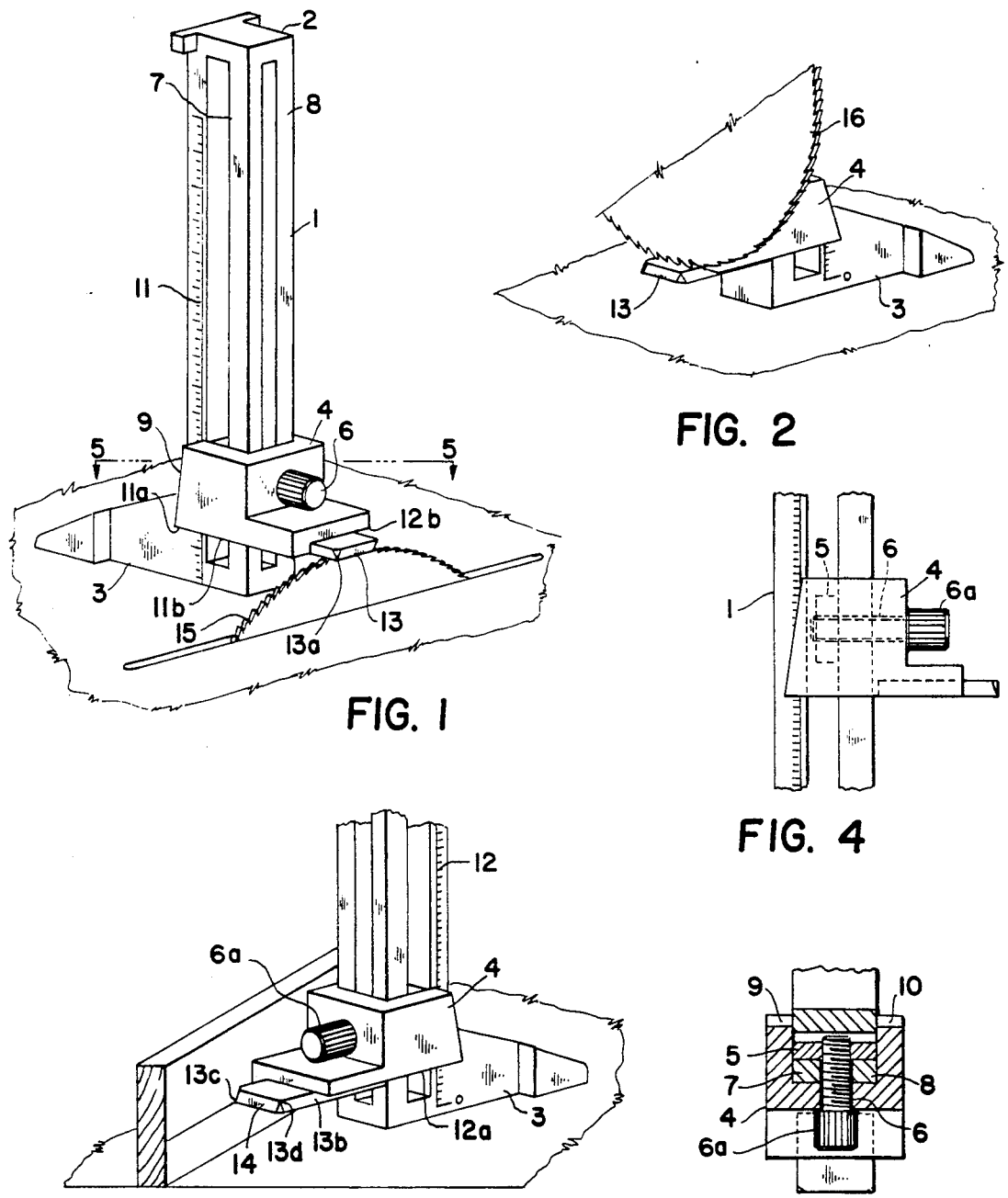

MEASURING DEVICE

BACKGROUND OF THE DISCLOSURE

The device of this disclosure is directed to the use of the same in relation to saws particularly, but also to other tools which are desirably positioned so as to cut to certain depths or certain heights as the case may be, particularly relating to circular saws as the best example of devices which particularly disclose the use of the device hereof.

In the broadest contemplation the invention is intended to be used with different kinds of tools which are cutting tools for example, which may be measured from one position and other types of tools measured from another position by indicating means carried by a common device such as the device hereof.

As far as is known the device incorporates novel elements related to each other so as to in corporate in one device, means to indicate several different types of cut depths or heights as the case may be whether by a circular saw or other tool where heights and depths are important to determine or to provide in ultimate workpieces when they are completed.

SUMMARY OF THE INVENTION

The invention hereof relates to what is termed a multi-level gauge device which includes in fact certain elements which permit movement of an indicating means along the device and to in turn if necessary scribe lines where desirable all related to one another or to a workpiece and to a cutting or other implement which results in work on the workpiece itself.

BRIEF DESCRIPTION OF THE DRAWINGS

As will be understood from a consideration of the specification appended hereto and shown in the drawings, the device hereof will be explained in relation to the drawings wherein FIG. 1 is a perspective view of the device to illustrate its vertical positioning attitude and certain of the indicating elements carried thereby, in relation to a saw to determine the height of a cut, for example.

FIG. 2 is a fragmentary view to illustrate the manner in which the device is used to establish the depth of a cut for example, by a circular saw or like machine.

FIG. 3 is a fragmentary perspective view showing the device as used to mark a workpiece for some operation to be performed.

FIG. 4 is a fragmentary view showing a section of the indicator block and the relation of the same to indicia.

FIG. 5 is a view taken about on the line 5—5 of FIG. 1 looking in the direction of the arrows to indicate the shape of certain of the parts.

DETAILED DESCRIPTION OF THE INVENTION

Turning now to a specific description of the invention, based upon the disclosures of the several figures, it will be noted that the device generally designated 1 includes a vertical column 2 with a foot 3 extending therefrom and integral therewith.

The column 1 is formed about as shown in FIG. 5 with what may be considered a hollowed out configuration wherein certain parts are movable in a manner to be described at this point in reference to what may be termed a sliding indicator block which is designated 4.

The indicator block 4 is in turn arranged so that as it is movable upwardly and downwardly on the column 2, it may be fixed in any given position by means as shown in FIG. 5 which include a lock element 5 operating inside the column and in conjunction with the block 4. The block 4 is thus adjustable into a chosen predetermined position by operation of a set screw 6 in turn manipulated by a knurled portion 6a so as to press the element 5 by means of the threaded portion of the screw 6 extending through the element, against the inside of the column and particularly the surfaces designated 7 and 8 thereof.

As will be seen, the block 4 is sort of saddle member formed so that it partly surrounds the column 2 and at its free extremities is equipped with an angular surface 9 at one side and 10 at the other of the column 2. These angular surfaces are related to certain indicia which are located on the column at 11 and 12 respectively referring to FIGS. 1 and 3. Thus reference may be had to the indicia by means of the lower extremity or corner 11a and 12a of each respective part, which are related to the indicia of the respective sides of the column at 11 and 12.

It will thus be seen that when the sliding block 4 is moved up and down to any given position, two different readings will be provided on the scales 11 and 12 by reason of the configuration of this sliding block. As shown in FIG. 1 the block 4 has a lower surface corresponding to the corner 11a and a higher surface corresponding to the corner 12A, the surface extending from 11a being denoted 11b and the higher surface extending from the corner 12a being denoted 12b.

The purpose of this arrangement is so that the sliding block 4 may have positioned thereon an indicator plate designated 13 which is rectilinear in cross section and rectangular in plan.

The end of the plate 13 is squared off at right angles and denoted 14, with one edge of the plate 13 designated 13a the other edge of the plate 13 designated 13b.

At the extremity of end 14, the corner of the plate 13 is sharpened so as to provide a point 13c along the edge 13a and 13d at the end of the edge 13b.

These sharpened corners will provide for scribing motions of the device as will be explained in connection with the operation.

In use of the device as a whole, referring to FIG. 1 for example, the same is intended to show the height of a saw blade such as 15 which is desired for use in cutting workpieces and in order to set the saw at a certain height or depth of cut which can be effected by the saw blade 15, the under surface of the plate 13 is availed of and the saw blade positioned to touch the same. The lower surface 11b corresponds to scale 11 to indicate the blade height for cutting a workpiece placed over the blade.

In contrast thereto as shown in FIG. 2 a saw blade 16 is shown as being above the top surface of the plate 13 so that by positioning the saw blade with respect to that surface, the height of a cut so to speak is able to be established. The higher surface 12b corresponds to scale 12 to indicate the blade depth for cutting a workpiece placed under the blade.

These cuts are related to the indicia 11 and 12 as previously noted and thus can be predetermined or determined later if desired.

It will be understood that the sliding indicator block 4 may be movable within wide limits and the scribing actions provided by the corners 13c and 13d useful for purposes which are readily understood by those skilled in the art.

I claim:

1. A measuring device comprising a scale stand including a vertical column and a foot part extending from the lower end of said column, first and second scales extending upwardly along said column on opposite sides thereof, an indicator block adjustably mounted on said column having a pair of free ends straddling said column, each of said free ends being adjacent to one of said first and second scales, means to maintain said block in adjusted positions on said column, an indicator plate fixed to said block at one end thereof, said plate having upper and lower faces, the upper face of said plate providing reference for depth of cut by a tool which is intended to engage a workpiece, the first scale relating to the upper face of the plate to indicate said depth of cut, the lower face of said plate providing reference for height of cut by a tool which is intended to engage a workpiece, the second scale relating to the lower face of said plate to indicate said height of cut.

2. A device as claimed in claim 1, wherein a free end opposite said fixed plate end of the indicator plate includes a scribing portion at one corner to scribe lines relating to the depth of cut to be effected in a workpiece.

3. A device as claimed in claim 2, wherein said free end of the plate includes a further scribing portion to scribe lines relating to the height of a cut to be effected in relation to a workpiece.

* * * * *